United States Patent
Kim

(10) Patent No.: US 7,755,989 B2
(45) Date of Patent: Jul. 13, 2010

(54) ENHANCED REPRODUCTION OF OPTICAL DISCS

(75) Inventor: Beom Jin Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 11/670,655

(22) Filed: Feb. 2, 2007

(65) Prior Publication Data

US 2007/0297306 A1    Dec. 27, 2007

(30) Foreign Application Priority Data

Jun. 27, 2006    (KR) .................. 10-2006-0057849

(51) Int. Cl.
*G11B 7/00* (2006.01)
(52) U.S. Cl. .................. 369/47.27; 369/47.1
(58) Field of Classification Search ............ 369/53.24, 369/275.3, 53.22, 44.26, 47.27, 47.1
See application file for complete search history.

(56) References Cited

U.S. PATENT DOCUMENTS 6,295,256 B1 * 9/2001 Kimikawa et al. ....... 369/44.32
7,428,202 B2 * 9/2008 Takahashi et al. ........ 369/53.24
7,499,388 B2 * 3/2009 Tahara .................. 369/124.12
7,555,626 B2 * 6/2009 Sasaki .................... 711/170

FOREIGN PATENT DOCUMENTS

| JP | 2000-100059 | 4/2000 |
| KR | 10-2005-0024552 | 3/2005 |
| KR | 10-2005-0082429 | 8/2005 |

OTHER PUBLICATIONS

Office Action from Korean Patent Office, dated Apr. 30, 2007, Application No. 10-2006-0057849, 3 pages.
Notice of Allowance from Korean Patent Office, dated Oct. 26, 2007, Application No. 10-2006-0057849, 2 pages.

* cited by examiner

*Primary Examiner*—Nabil Z Hindi
(74) *Attorney, Agent, or Firm*—Fish & Richardson P.C.

(57) ABSTRACT

In performing reproduction of optical discs, when a request to perform a data reproduction operation is received, it is detected whether finalization data is written to a finalization indicator region of an optical disc, and a record-related servo adjustment operation is performed if finalization data is not written to the finalization indicator region. In addition, a reproduction-related servo adjustment operation is performed, and the data reproduction operation is performed.

20 Claims, 4 Drawing Sheets

ENHANCED REPRODUCTION OF OPTICAL DISCS

CROSS-REFERENCE TO RELATED APPLICATIONS

This application claims priority to Korean Patent Application No. 10-2006-0057849, filed on Jun. 27, 2006, which is incorporated herein by reference

BACKGROUND

1. Field

The present disclosure relates to the reproduction of optical discs, and one particular implementation relates to the selective performance of record-related servo adjustment operations while reproducing an optical disc.

2. Description of the Related Art

Conventional optical discs, such as digital versatile discs ("DVDs"), are capable of recording large quantities of data, including high-quality audio and video data. Depending upon particular data storage circumstances, it is possible to record all data an optical disc at one time, or at different times in different titles or sessions. When only a subset of the data is recorded and the disc remains open to the recording of further titles, the disc is referred to as being not finalized.

SUMMARY

According to one general arrangement, when a request to perform a data reproduction operation is received, a determination is made as to whether finalization data is written to a finalization indicator region of an optical disc, and a record-related servo adjustment operation is performed if finalization data is not written to the finalization indicator region. In addition, a reproduction-related servo adjustment operation and the data reproduction operation are performed.

Implementations may include one or more of the following features. For example, where the optical disc is a DVD, the finalization indicator region may be physical sector numbers 0x30000~0x30500. The reproduction-related servo adjustment operation may further include a focusing-error gain/offset adjustment for reproduction function, a tracking error offset adjustment for reproduction function, a focusing balance adjustment for reproduction function, and a tilt adjustment for reproduction function. The record-related servo adjustment operation may further include a focusing-error gain/offset adjustment for recording function, a tracking error offset adjustment for recording function, a focusing balance adjustment for recording function, and a tilt adjustment for recording function. The optical disc may be a HD-DVD optical disc, a Blu-ray optical disc, or a HDDS optical disc. The finalization indicator region may be between a lead-in region and the data storage region of the optical disc, and may be accessed by an optical pickup device without reading data. A determination of whether to perform a record-related servo adjustment operation based upon whether finalization data is written to the finalization indicator region may also occur.

According to another general arrangement, an optical disc recording device includes a signal processing unit and a processor. The signal processing unit is configured to detect whether finalization data is written to a finalization indicator region of an optical disc. The processor is configured to receive a request to perform a data reproduction operation, perform a record-related servo adjustment operation if finalization data is not written to the finalization indicator region, perform a reproduction-related servo adjustment operation, and perform the data reproduction operation.

Where a recordable optical disc remains open, record-related servo adjustment operations are performed in order to read record-related data from the optical disc. However, in the case where the optical disc has been finalized and where it is not necessary to read record-related data from the optical disc, record-related servo adjustment operations are not performed. By selectively omitting certain operations or functions, the reproduction of a finalized optical disc can occur more quickly and efficiently, requiring fewer system resources.

The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Figure 1:
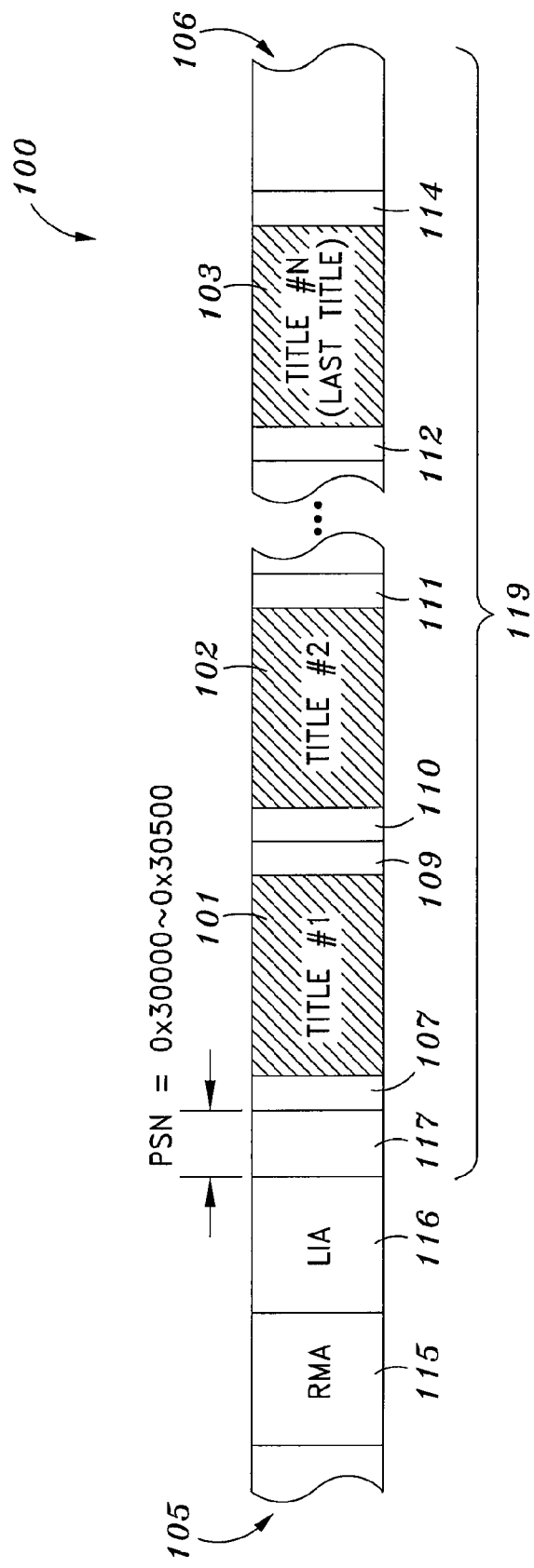
FIG. 1 illustrates the arrangement of an example recordable optical disk, in particular a DVD-R, in which data corresponding to multiple titles has been recorded.

When a title is recorded into the data area of the disc, file system information corresponding to that title is generated and recorded into a leading portion disposed ahead of the title and a trailing portion disposed behind the title. Since the file system information includes data corresponding to the currently-recorded title as well as all previously-recorded titles, the file system information generated for the last-recorded title will include data associated with all titles on the optical disc. Additionally, navigation information, such as data start/end addresses ("DATA_REC_S_ADD" and "DATA$_{REC\_E\_}$ADD") of each title is also recorded in the recording management area ("RMA") of the recordable optical disc, disposed ahead of the lead-in area ("LIA"), or lead-in region. When the optical disc is finalized, file system information for the last-recorded title is copied to a specified finalization indicator region of the optical disc, and the navigation information is copied from the RMA to the control data zone within the LIA.

When a recordable optical disc is inserted into an optical disc recording device, the device performs a record-related servo adjustment operation prior to reading record-related data formed in the wobble of the disc. The record-related servo adjustment operation includes a focusing and tracking offset adjustment for recording function, a focusing balance adjustment for recording function, a tilt adjustment for recording function, and other functions. Record-related servo adjustment operations are performed to enable the optical disc recording device to write the file system information associated with the last-recorded title into the finalization indicator region, thereby allowing the optical disc recording device to reproduce a non-finalized optical disc.

After the record-related servo adjustment operation is completed, the type of optical disc is determined by reading data from the optical disc, such as the record management data ("RMD")(in the case of DVD-R), or the session disc control block ("SDCB") data (in the case of DVD+R). The optical disc type may include, for example, DVD-R, DVD+R, DVD-RW, DVD+RW, DVD+RAM compatible discs, or a high density digital versatile disc ("HD-DVD"), a Blu-Ray disc, or a holographic digital data storage ("HDDS") disc. Once the disc type is determined, the optical disc recording device determines Whether the disc is finalized, such that no further recording is possible, or open, such that recording of additional titles is possible. If the disc is open, the recorder determines the addresses which are capable of storing additional data by reading address tables stored in the RMD or SDCB.

Once the type of disc is determined, the optical disc recording device performs reproduction-related servo adjustment operations to enable the performance of the requested data reproduction operation. In this regard, regardless of whether an optical disc is finalized or open, optical disc recording devices may perform operations associated with both record-related servo adjustment and reproduction-related servo adjustment each time a reproduction operation is requested. At a minimum, these operations may require the optical disc recording device to perform both recording and reproducing tracking error ("TE") main-beam signal push-pull ("MPP")/sub-beam signal push-pull ("SPP") balance functions (collectively a "TE balance" function), both recording and reproduction TE MPP/SPP offset functions (collectively a "TE offset" function), both recording and reproducing focusing error ("FE") offset functions, both recording and reproducing FE balance functions, tilt adjustment functions, high-speed recording-related adjustment functions, radio frequency ("RF") amplitude functions, wobble balance functions, wobble offset functions, and disc type determining functions.

FIG. 1 illustrates the arrangement of an example recordable optical disk 100, in particular a DVD-R, in which data corresponding to multiple titles has been recorded. In particular, titles 101 to 103 are recorded in sequence from the inner circumference 105 to the outer circumference 106 of the optical disc 100. File system information corresponding to the title 101 is recorded into the leading portion 107 and the trailing portion 109, file system information corresponding to the title 102 is recorded into the leading portion 110 and the trailing portion 111, and file system information corresponding to the title 103 is recorded into the leading portion 112 and the trailing portion 114. Navigation information, such as data start and end addresses, is recorded into the RMA 115, which is disposed in front of the LIA 116.

When the optical disc is finalized, file system information for the last-recorded title 103, which includes the file system information for all previously-recorded titles, is copied to the finalization indicator region 117 of the optical disc 100. Navigation information recorded in the RMA 115 is also copied to the control data zone within the LIA 116. As illustrated in FIG. 1, the finalization indicator region of a DVD-R is disposed at physical sector numbers ("PSNs") 0x30000~0x30500, although the finalization indicator region may vary for different optical disc recording types. Collectively, the finalization indicator region, as well as the region of the optical disc where titles are recorded, including corresponding leading and trailing portions, is referred to as the data area 119.

The optical disc apparatus, such as a DVD recorder or other type of optical disc recording apparatus, reads out information about data within the lead-in area 116 and a specified data region of an inserted optical disc, and performs a reproduction operation based on the information. If data is recorded in the finalization indicator region, for example PSNs 0x30000~0x30500 of a DVD-R, record-related servo adjustment operations are omitted, and reproduction-related servo adjustment operations are preformed, thereby expediting the reproduction operation.

Figure 2:
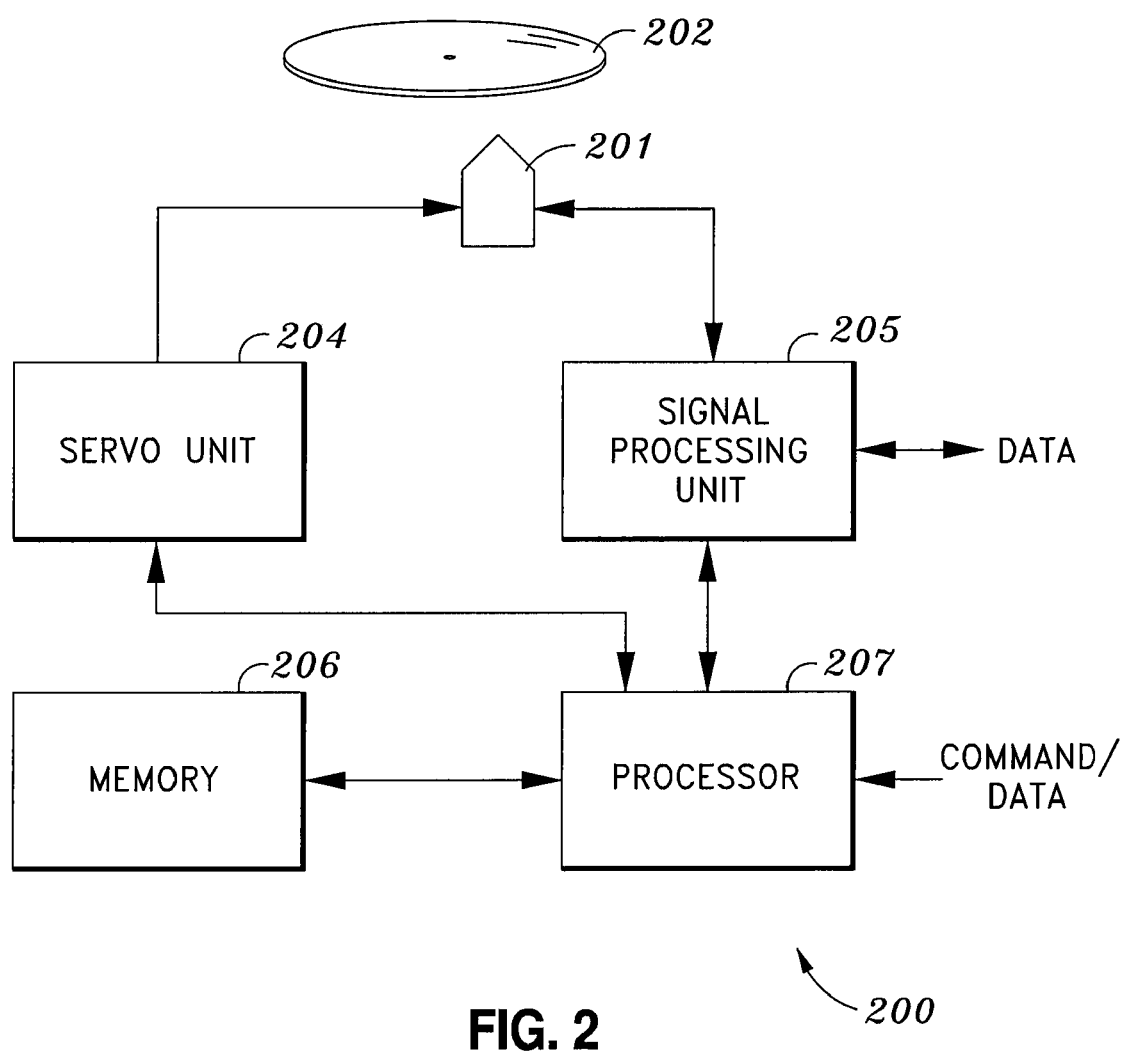
FIG. 2 is a block diagram illustrating an exemplary optical disc recording apparatus.

FIG. 2 is a block diagram illustrating an exemplary optical disc recording apparatus 200. The recordable optical disc apparatus 200 includes an optical pickup 201 for reading or writing data on the optical disc 202, a servo unit 204 for positioning the optical pickup 201 to allow the data to be read out from the optical disc 202 or to be recorded on the optical disc 202, a signal processing unit 205 for receiving a reproducing signal from the optical pickup 201 to restore the data or modulate the data to record into a recording signal, a memory 206 for temporarily storing the various information and data, and a processor 207 for controlling each of the components.

When a one-time recordable optical disc is finalized, the processor 207 copies the file system information recorded in the last-recorded title (Title #N) from the data area and records the information in the specified finalization indicator region. For example, when the last title has been recorded, the processor 207 generates file system information for all previously-recorded titles and the file system information for the last-recorded title. The file system information for all previously-recorded titles is stored in memory 206, and the file system information for the last title is generated based upon the controlling of the servo unit 204 and the signal processing unit 205. The collected file system information is recorded in the leading portion and the trailing portion of the data area in which the last title has been recorded, and is also copied to the finalization indicator region, which is PSNs 0x30000~0x30500 in the case of a DVD-R.

By controlling the servo unit 204 and the signal processing unit 205, the processor 207 copies various navigation information, such as the data record-start and end addresses of each title, which is temporarily stored in the RMA of the disc, and records the navigation information within the LIA. If a recordable DVD is inserted into the apparatus 200, for example, the processor 207 confirms whether a high frequency radio-frequency ("RF") signal is detected from the finalization indicator region located at PSNs 0x30000~0x30500. Even in the case where the tracking servo is 'off' and the focusing servo is 'on,' it is still possible to confirm whether the RF signal is detected. Furthermore, even in the case that the focusing servo is 'off,' it is possible to confirm whether the RF signal is detected, since the RF signal is realized via an AC component or DC component of the reproduction signal that is generated as the actuator moves in an up or down direction to make the S-curve associated with a focus error signal ("FES") when an optical disc is inserted into a recording device.

Since data is recorded in a combination of pits and spaces, the DC components of the reproduction signal read out from the corresponding area would be of a high level, and the AC components of the reproduction signal would be low when spaces exist in the finalization indicator region, indicating that data is not recorded. Accordingly, it is possible to confirm whether the RF signal is detected in the finalization indicator region even in the case where the tracking servo or the focusing servo are 'off.'

If the RF signal is detected, the processor 207 determines that the optical disc is finalized, and performs reproduction-related servo adjustment operations, without performing record-related servo adjustment operations. Subsequently, the processor reads out the data recorded in the control data zone, and performs the reproducing operation for the inserted disc.

Figure 3:
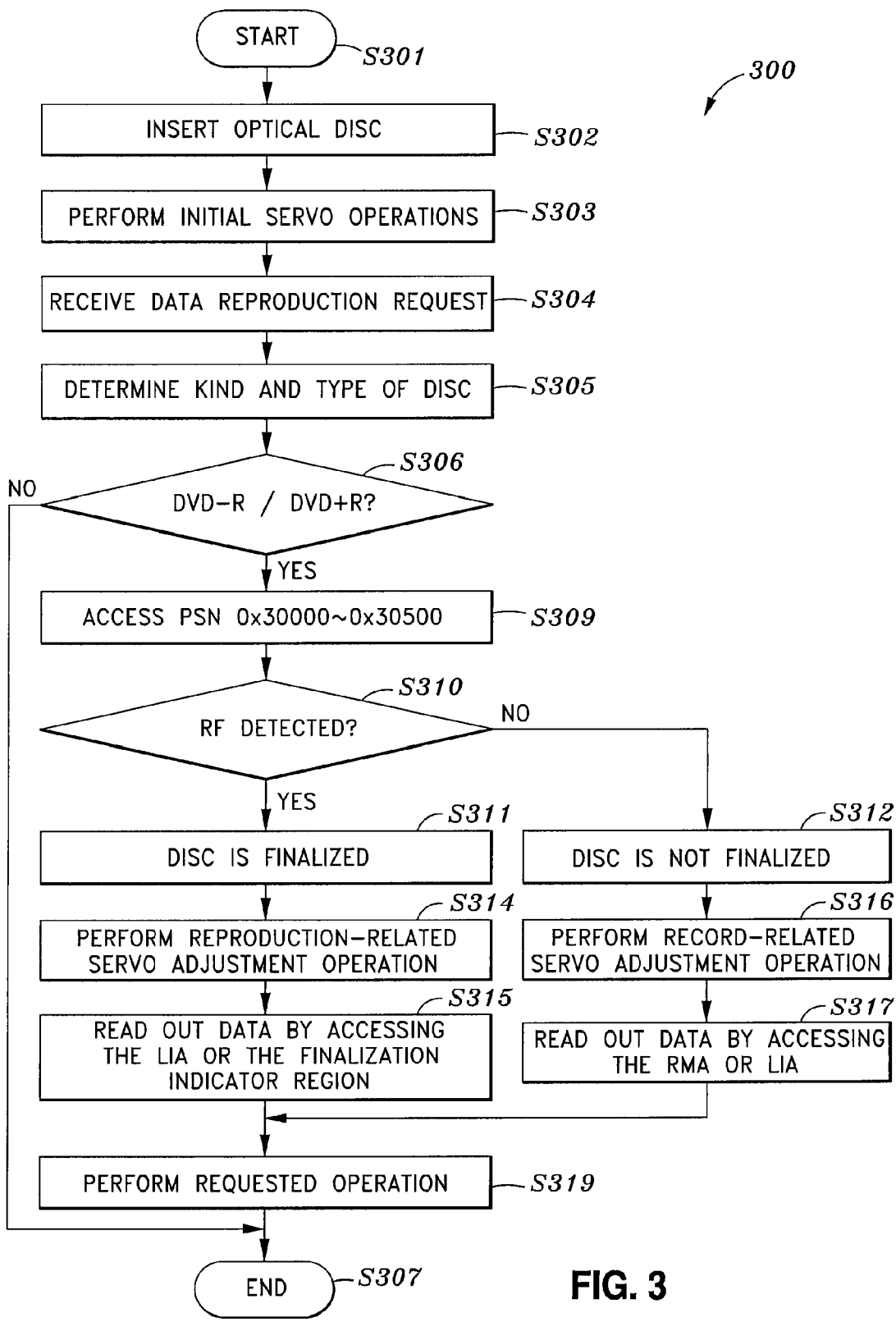
FIGS. 3 and 4 are flowcharts illustrating exemplary methods for reproducing an optical disc.

FIG. 3 is a flowchart illustrating an exemplary method 300 for reproducing an optical disc. In more detail, method 300 begins (S301) when an optical disc is inserted into an optical disc recording apparatus (S302) and a processor, such as processor 207, performs a series of initial servo operations (S303). In one example, the initial servo operations are performed when the processor 207 positions a spindle servo and sled servo for the optical disk 202, by controlling servo unit 204, when optical disc 202 is inserted into optical disc recording apparatus 200. A request to perform a data reproduction operation is received (S304), either automatically, such as by default when an optical disc is entered into the optical device recording apparatus, or by a manual keystroke entry from a user.

The kind of optical disc, such as CD or DVD, and type of disc (DISC_TYPE) are determined (S305). In one example, the processor 207 determines the disc type and kind on the basis of the reflectivity of the optical disc 202, or upon a 'level' or 'time to be detected' S-curve associated with the FES signal of an inserted optical disc. Since different types of optical discs exhibit different S-curves when inserted into a recording device, the recording device may compare a measured S-curve to stored S-curves and find the closest match, thereby determining the appropriate type of the inserted disc.

If the inserted optical disc is not a DVD (S306), the method 300 ends (S307). If the inserted optical disc is a DVD (S306), the finalization indicator region is accessed to determine if the optical disc is finalized (S309). In one example, the processor 207 accesses PSNs 0x30000~0x30500 of optical disc 202, which is the finalization indicator region of a DVD-R.

The optical pickup may move to a desired inner or outer circumference location of the disc using an address obtained through decoding data recorded on the disc. According to one implementation, the optical pickup can access the finalization indicator region without first decoding data, by moving towards the innermost circumference until the inner limit switch is contacted, then moving from the inner circumference towards the outer circumference for a predetermined time, using the sled motor controlled by the servo unit. In this regard, the finalization indicator region is accessed without reproducing the data through servo operations, such as focusing, tracking or constant linear velocity ("CLV") functions.

If an RF signal is detected at the finalization indicator region (S310), a determination is made as to whether the optical disc is finalized (S311). If an RF signal is not detected at the finalization indicator region (S310), a determination is made that the optical disc is still open and is not finalized (S312). As indicated above, it is possible to confirm whether the RF signal is detected even if the tracking servo is 'off' and the focusing servo is 'on,' or if the focusing servo is 'off,' since the RF signal is realized via an AC component or DC component of the reproduction signal that is generated as the actuator moves in an up or down direction to is indicative of an S-curve. Accordingly, the RF signal may still be detected in the finalization indicator region even where the tracking servo or the focusing servo is 'off.'

If it is determined that the optical disc is finalized (S311), a reproduction-related servo adjustment operation is performed instead of a record-related servo adjustment operation (S314). In one example, the processor 207 performs the reproduction-related servo adjustment operation. The reproduction-related servo adjustment operation includes a focusing-error (FE) gain/offset adjustment for reproduction, tracking error offset adjustment for reproduction, focusing balance adjustment for reproduction, tilt adjustment for reproduction, and/or other operations.

Once the reproduction-related servo adjustment operation is performed (S314), data necessary to reproduce the optical disc is read out by accessing the control data zone of the LIA and/or the relevant portion of the finalization indicator region (S315). In one example, the data is read out using the processor 207.

If it is determined that the optical disc is open, or not finalized (S312), the processor 207 performs a record-related servo adjustment operation (S316). Record-related servo adjustment operations include, for example, an FE gain/offset adjustment for recording, TE offset adjustment for recording, focusing balance adjustment for recording, tilt adjustment for recording, and/or other operations.

Once the record-related servo adjustment operation is performed, data necessary to reproduce the optical disc is read out, by accessing the RMA area and/or the control data zone within the LIA (S317). In one example, the data is read out by the processor 207. The data reproduction operation requested (at S304) is performed (S319).

Figure 4:
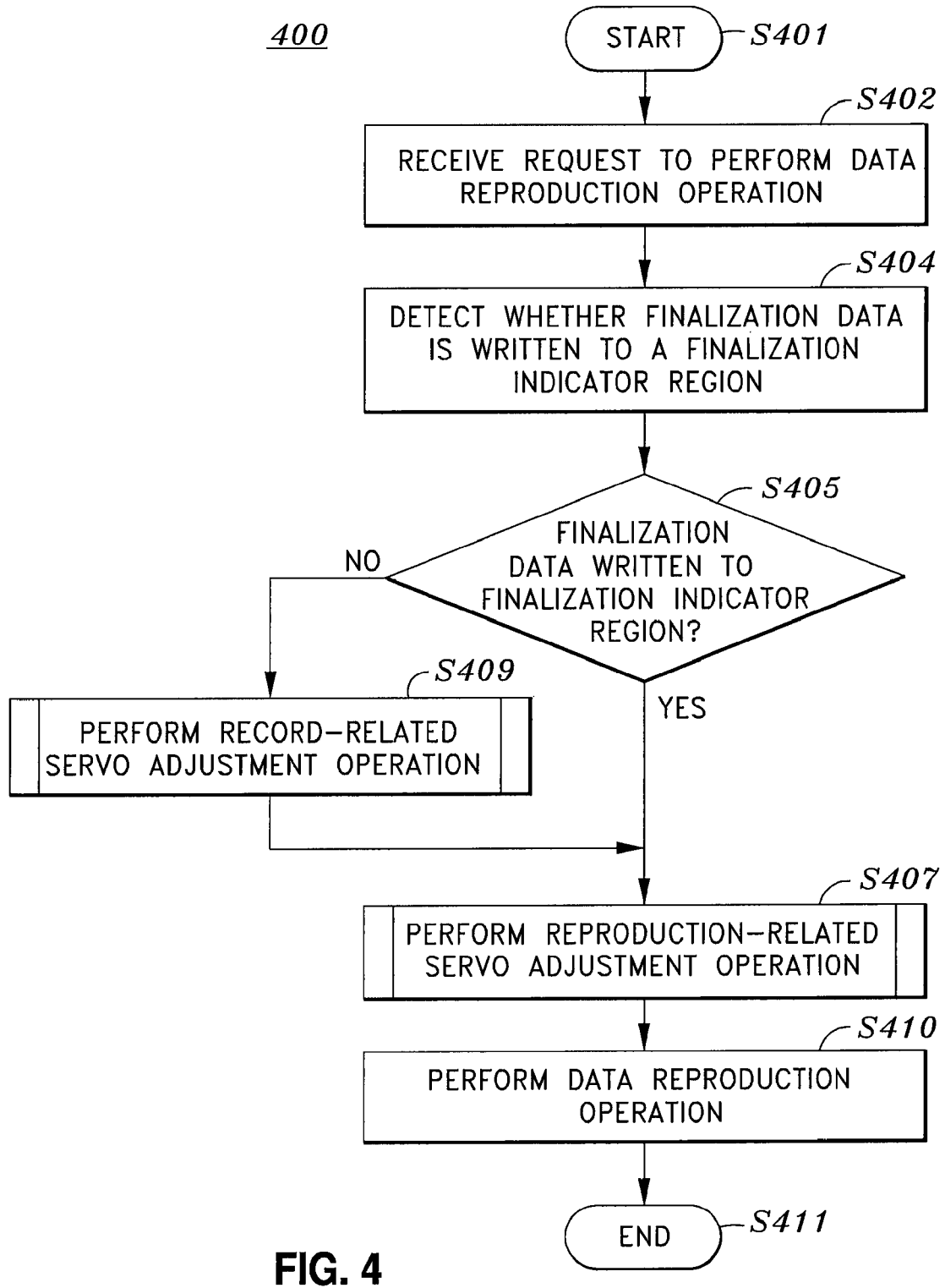

FIG. 4 is a flowchart illustrating another exemplary method 400 for reproducing an optical disc. Briefly, a request to perform a data reproduction operation is received, a determination is made as to whether finalization data is written to a finalization indicator region of an optical disc, and a record-related servo adjustment operation is performed if finalization data is not written to the finalization indicator region. In addition, a reproduction-related servo adjustment operation and the data reproduction operation are performed.

Briefly, when method 400 begins (S401), a request to perform a data reproduction operation is received (S402). Whether finalization data is written to a finalization indicator region of an optical disc is detected (S404), and a determination of whether to perform a record-related servo adjustment operation is made, based upon whether finalization data is written to the finalization indicator region.

If the optical disc is a DVD, for example, the finalization indicator region may be physical sector numbers 0x30000~0x30500. Alternatively, the optical disc may be a HD-DVD optical disc, a Blu-ray optical disc, a HDDS optical disc, or another type of optical disc. The finalization indicator region may be between a LIA and the data storage region of the optical disc, and may be accessed by an optical pickup device without reading data.

If finalization data is not written to the finalization indicator region (at S405), a record-related servo adjustment operation is performed (S409). The record-related servo adjustment operation further includes a focusing-error gain/offset adjustment for recording function, a tracking error offset adjustment for recording function, a focusing balance adjustment for recording function, a tilt adjustment for recording function, and/or other functions. In another example implementation, the record-related servo adjustment operations include recording TE MPP/SPP balance functions, recording TE MPP/SPP offset functions, recording FE offset functions, recording FE balance functions, tilt adjustment functions, high-speed recording-related adjustment functions, wobble balance functions, wobble offset functions, and a disc type determining function. In one example test platform, these functions take approximately six seconds, such that the appropriate omission of these functions speeds up a reproduction operation considerably.

After performing the record-related servo adjustment operation (S409) or determining that finalization data is written to the finalization indicator region (S405), a reproduction-related servo adjustment operation is performed (S407). The reproduction-related servo adjustment operation further include a focusing-error gain/offset adjustment for reproduction function, a tracking error offset adjustment for reproduction function, a focusing balance adjustment for reproduction function, a tilt adjustment for reproduction function, and/or other functions. In another example implementation, the reproduction-related servo adjustment operations include a reproducing TE MPP/SPP balance function, a reproducing TE MPP/SPP offset function, a reproducing FE offset function, a reproducing FE balance function, and an RF amplitude function. After the data reproduction operation is performed (S410), method 400 ends (S411).

According to another general arrangement, an optical disc recording device includes a signal processing unit and a processor. The signal processing unit is configured to detect whether finalization data is written to a finalization indicator region of an optical disc. The processor is configured to receive a request to perform a data reproduction operation, perform a record-related servo adjustment operation if finalization data is not written to the finalization indicator region, perform a reproduction-related servo adjustment operation, and perform the data reproduction operation.

It is understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components.

The arrangements have been described with particular illustrative embodiments. It is to be understood that the concepts and implementations are not however limited to the above-described embodiments and that various changes and modifications may be made.

What is claimed is:

1. A method comprising:
   detecting presence or absence of a radio frequency signal at a finalization indicator region of an optical disc;
   performing a record-related servo adjustment operation in response to detecting absence of the radio frequency signal at the finalization indicator region; and
   performing a reproduction-related servo adjustment operation in response to detecting presence of the radio frequency signal at the finalization indicator region.

2. The method of claim 1, wherein the optical disc is a digital versatile disc ("DVD"), and wherein the finalization indicator region is physical sector numbers 0x30000~0x30500.

3. The method of claim 1, wherein the reproduction-related servo adjustment operation further comprises a focusing-error gain/offset adjustment for reproduction function, a tracking error offset adjustment for reproduction function, a focusing balance adjustment for reproduction function, and a tilt adjustment for reproduction function.

4. The method of claim 1, wherein the record-related servo adjustment operation further comprises a focusing-error gain/offset adjustment for recording function, a tracking error offset adjustment for recording function, a focusing balance adjustment for recording function, and a tilt adjustment for recording function.

5. The method of claim 1, wherein the optical disc is a high density digital versatile disc ("HD-DVD") optical disc, a Blu-ray optical disc, or a holographic digital data storage ("HDDS") optical disc.

6. The method of claim 1, wherein the finalization indicator region is between a lead-in region and the data storage region of the optical disc.

7. The method of claim 1, wherein the finalization indicator region is accessed by an optical pickup device without reading data.

8. The method of claim 1, further comprising determining whether data can be recorded on the optical disc based upon whether the radio frequency signal is detected at the finalization indicator region.

9. An optical disc recording device comprising:
   a signal processing unit configured to detect presence or absence of a radio frequency signal at a finalization indicator region of an optical disc; and
   a processor configured to:
      perform a record-related servo adjustment operation in response to detecting absence of the radio frequency signal at the finalization indicator region, and
      perform a reproduction-related servo adjustment operation in response to detecting presence of the radio frequency signal at the finalization indicator region.

10. The optical disc recording device of claim 9, wherein the optical disc is a digital versatile disc ("DVD"), and wherein the finalization indicator region is physical sector numbers 0x30000~0x30500.

11. The optical disc recording device of claim 9, wherein the reproduction-related servo adjustment operation further comprises a focusing-error gain/offset adjustment for reproduction function, a tracking error offset adjustment for reproduction function, a focusing balance adjustment for reproduction function, and a tilt adjustment for reproduction function.

12. The optical disc recording device of claim 9, wherein the record-related servo adjustment operation further comprises a focusing-error gain/offset adjustment for recording function, a tracking error offset adjustment for recording function, a focusing balance adjustment for recording function, and a tilt adjustment for recording function.

13. The optical disc recording device of claim 9, wherein the optical disc is a high density digital versatile disc ("HD-DVD") optical disc, a Blu-ray optical disc, or a holographic digital data storage ("HDDS") optical disc.

14. The optical disc recording device of claim 9, wherein the finalization indicator region is between a lead-in region and the data storage region of the optical disc.

15. The optical disc recording device of claim 9, further comprising an optical pickup unit configured to access the finalization indicator region without reading data.

16. The optical disc recording device of claim 9, wherein the processor is further configured to determine whether data can be recorded on the optical disc based upon whether the radio frequency signal is detected at the finalization indicator region.

17. The method of claim 1 further comprising accessing the finalization indicator region without decoding, through servo operations, data recorded in the finalization indicator region,
   wherein detecting presence or absence of the radio frequency signal at the finalization indicator region of the optical disc comprises detecting presence or absence of the radio frequency signal at the finalization indicator region of the optical disc based on the accessing of the finalization indicator region without decoding, through servo operations, data recorded in the finalization indicator region.

18. The method of claim 17:
   wherein accessing the finalization indicator region without decoding, through servo operations, data recorded in the finalization indicator region comprises:

moving an optical pickup to an inner circumference of the optical disc at a position in which an inner limit switch is contacted, and moving the optical pickup from the inner circumference of the optical disc towards an outer circumference of the optical disc for a predetermined time; and wherein detecting presence or absence of the radio frequency signal at the finalization indicator region of the optical disc based on the accessing of the finalization indicator region without decoding, through servo operations, data recorded in the finalization indicator region comprises detecting presence or absence of the radio frequency signal at the finalization indicator region of the optical disc based on the movement of the optical pickup from the inner circumference of the optical disc towards the outer circumference of the optical disc for the predetermined time.

19. The method of claim 1 wherein detecting presence or absence of the radio frequency signal at the finalization indicator region of the optical disc comprises detecting presence or absence of the radio frequency signal at the finalization indicator region of the optical disc in a configuration in which a tracking servo and a focusing servo are in an off state such that tracking and focusing servo operations are not performed.

20. The method of claim 1 wherein performing the reproduction-related servo adjustment operation in response to detecting presence of the radio frequency signal at the finalization indicator region comprises:

determining that finalization data is written to the finalization indicator region based on detecting presence of the radio frequency signal at the finalization indicator region;

in response to determining that finalization data is written to the finalization indicator region, determining that performance of the record-related servo adjustment operation is unnecessary for a data reproduction operation; and performing the reproduction-related servo adjustment operation without performing the record-related servo adjustment operation based on the determination that performance of the record-related servo adjustment operation is unnecessary for the data reproduction operation.

\* \* \* \* \*